(12) United States Patent
Hamm et al.

(10) Patent No.: US 9,660,320 B2
(45) Date of Patent: May 23, 2017

(54) HIGH EFFICIENCY MOUNTING ASSEMBLY FOR SATELLITE DISH REFLECTOR

(71) Applicant: Highlands Diversified Services, Inc., London, KY (US)

(72) Inventors: Michelle Hamm, London, KY (US); Jeff Lester, Paint Lick, KY (US)

(73) Assignee: Highlands Diversified Services, Inc., London, KY (US)

( * ) Notice: Subject to any disclaimer, the term of this patent is extended or adjusted under 35 U.S.C. 154(b) by 0 days.

(21) Appl. No.: 14/735,840

(22) Filed: Jun. 10, 2015

(65) Prior Publication Data

US 2016/0365619 A1 Dec. 15, 2016

(51) Int. Cl.
*H01Q 15/14* (2006.01)
*H01Q 1/12* (2006.01)
*F16M 13/02* (2006.01)
*H01Q 19/13* (2006.01)

(52) U.S. Cl.
CPC .......... *H01Q 1/1242* (2013.01); *F16M 13/02* (2013.01); *H01Q 1/125* (2013.01); *H01Q 15/14* (2013.01); *H01Q 19/13* (2013.01)

(58) Field of Classification Search
CPC ....... H01Q 1/1242; H01Q 15/14; F16M 13/02
USPC ................... 343/725, 765, 760, 912
See application file for complete search history.

(56) References Cited

U.S. PATENT DOCUMENTS

| | | | |
|---|---|---|---|
| 4,584,589 A | 4/1986 | Bivins et al. | |
| 4,628,323 A * | 12/1986 | Crean | F16M 11/12 343/765 |
| 4,948,185 A | 8/1990 | Miller | |
| 5,334,990 A * | 8/1994 | Robinson | H01Q 1/125 343/840 |
| 5,646,638 A | 7/1997 | Winegard et al. | |
| (Continued) | | | |

FOREIGN PATENT DOCUMENTS

| | | |
|---|---|---|
| DE | 3530809 A1 | 3/1987 |
| DE | 3709679 A1 | 10/1988 |
| (Continued) | | |

OTHER PUBLICATIONS

International Searching Authority, International Search Report issued in related International Application No. PCT/US2016/036618, 6 pages.

*Primary Examiner* — Jean B Jeanglaude
(74) *Attorney, Agent, or Firm* — Wood, Herron & Evans, LLP

(57) ABSTRACT

A reflector dish assembly including a support structure, a reflector dish, and a reflector bracket configured for mounting the reflector dish. A support arm supports an electronic device and an elbow bracket is configured for coupling with an end of the support arm. A seat section of the elbow bracket is configured for engaging with the reflector bracket for securing the support arm in relation to the reflector dish. The reflector bracket includes a seat to receive the elbow bracket seat section, with the seat having bosses and support tabs spaced linearly from the bosses. The elbow bracket seat section includes guide slots configured for sliding over the bosses when the seat receives the seat section. The elbow bracket seat section includes support slots for receiving the support tabs of the reflector bracket seat and securing the guide slots with the bosses.

20 Claims, 15 Drawing Sheets

(56) References Cited

U.S. PATENT DOCUMENTS

| | | | |
|---|---|---|---|
| 5,870,059 A * | 2/1999 | Reynolds | H01Q 1/1242 343/760 |
| 5,929,817 A | 7/1999 | Clark | |
| 6,124,836 A | 9/2000 | Rogers | |
| D433,014 S | 10/2000 | Rogers | |
| 7,532,735 B2 * | 5/2009 | Whitehouse | H04R 1/026 381/386 |
| 7,576,704 B2 * | 8/2009 | Woodward | H01Q 1/1221 248/237 |
| 7,791,553 B2 | 9/2010 | Conrad | |
| 8,368,611 B2 * | 2/2013 | King | H01Q 1/125 343/725 |
| 2007/0247390 A1 | 10/2007 | Lin et al. | |
| 2008/0099643 A1 | 5/2008 | Lin | |
| 2010/0097288 A1 | 4/2010 | Wen-Chao | |
| 2011/0030015 A1 * | 2/2011 | King | H01Q 1/125 725/68 |
| 2013/0021221 A1 | 1/2013 | Christie | |

FOREIGN PATENT DOCUMENTS

| | | |
|---|---|---|
| FR | 2793607 A1 | 11/2000 |
| WO | 9827608 A1 | 6/1998 |

* cited by examiner

HIGH EFFICIENCY MOUNTING ASSEMBLY FOR SATELLITE DISH REFLECTOR

FIELD OF THE INVENTION

The present invention is directed to a mount for a satellite reflector dish, and particularly to a rapid-installation, high efficiency mount for such a reflector dish.

BACKGROUND OF THE INVENTION

Television, internet, and other data services have become ubiquitous in today's society and thus are widely used both by individual and also commercial customers. Such services are offered to homes and businesses through a variety of media, including cable media and over-the-air satellite media.

While cable media was an early and widely-used mode for providing such services, over-the-air satellite services have recently become more popular, particularly in the residential market. Such satellite services require the use of a satellite dish reflector or antenna to receive the signals from a plurality of satellites that are orbiting the earth in a geo-synchronous orbit or some other orbit. Such reflector dishes capture the signals and efficiently reflect and direct those signals to a suitable feed arrangement referred to as an LNB or low noise block converter. The LNB captures the signal from the reflector dish, and then amplifies and down converts the signals to a suitable intermediate frequency. The signals are then directed to receiver electronics for further processing and conversion in order to interface with one or more televisions, computers, or other devices within a building.

To that end, the reflector dishes are often mounted at suitable locations and elevated positions on or around a building for efficient and interference-free reception of the satellite signals. Often, such an elevated location includes the roof or side of a building, such as a house. In that way, the reflector dish has an unobstructed view to the direction of the satellite(s), where the signals originate.

Satellite services are provided by a variety of different companies, and as part of that service, representatives of the company and contractors will install the system and connect the system to the appropriate electronics, such as a television or computer. As part of the installation process, the reflector dish must be mounted securely at a suitable location and then aimed, in both elevation and azimuth, toward the appropriate satellite(s). As such, an installer or contractor must be proficient at mechanically assembling and mounting the satellite dish, as well as connecting and programming the appropriate receiver electronics with the customer's computers, televisions or other devices.

In the current sales of satellite services, such installers/contractors not only provide the installation, but also operate as sales personnel in selling and explaining the various services and service packages that the service provider has available for customers. Various different cost levels and service levels are often available. As such, the sales aspect of the service installation is an important part of the customer interaction by the installation representatives of the service provider. Therefore, it is desirable that sales/service personnel can efficiently install the equipment, so that a significant amount of time might be spent with the actual customer in explaining the services and selling those services. Furthermore, since those sales/service personnel will be visiting a plurality of customers during the course of a business day, it is important that they be able to efficiently install the services, and still have significant sales time to ensure that a customer gets the service package they need, and to ensure that the installer personnel can explain and sell the various packages that are available. Obviously, the greater the amount of services or the higher the level of the service package that is sold to individual customers, the greater the profitability of the installer/contractor as well as the business of the service provider.

One particular hindrance to the sales aspects of an installation is the mechanical difficulty and time required to properly mount and aim the dish reflector for proper reception. As may be appreciated, reflector dish mounts generally utilize a number of different parts and pieces, which must be assembled together properly, and then mounted on a support surface. For example, such a mount assembly involves different fasteners, such as bolts or screws, and the different components of the antenna system must be properly aligned and then secured together in alignment. More specifically, the components must be aligned, held in place in proper alignment, and small fasteners, such as bolts, must be threaded or directed into various holes and tightened or secured into place. This occurs all while holding various heavy components, such as a dish reflector, a mast, support legs, the LNB, etc. Accordingly, existing mounting structures can be complicated and time consuming to install. Furthermore, the installation may require two or more installers to facilitate the handling of the various components, including the dish antenna and its proper mounting. This, in turn, drives up the cost of the overall installation process.

Furthermore, such installations are often made in an elevated position, such as on the roof of a building, or other location, where a ladder is necessary. As such, the installer personnel are often working at the elevated position while manipulating bulky and sometimes awkward components, such as the large dish reflector as well as small fasteners The process is further complicated by the fact that the installers have to ensure that they safely remain at their elevated position during the installation, and avoid falls or other mishaps.

Therefore, one drawback to current installations is that the time taken for such an installation takes away from the time that the installation personnel can spend with the customer for actually selling the various service packages and a possible higher level of service. That is, the complex installation process takes away from the sales interaction with the customer, and thus, decreases the overall profitability of the installation and sales process for the service provider.

Accordingly, it is desirable to improve upon existing antenna systems, and particularly, to improve upon the installation features of such a system to thereby reduce installation time. Furthermore, it is desirable to make the installation as efficient, safe, and secure as possible while providing an increased amount of time for the installation personnel to perform the sales aspects of their job. It is also desirable to enhance the safety aspects of the installation process since the installer is often performing the installation at an elevated position. Still further, it is desirable to provide a secure and strong installation that will ensure that the reflector dish remains in the proper location and aimed position for receipt of the satellite signals. These objectives and various other objectives are addressed by the present invention, as described herein.

The accompanying drawings, which are incorporated in and constitute a part of this specification, illustrate embodiments of the invention and, together with a general description of the invention given below, serve to explain the principles of the invention.

DETAILED DESCRIPTION

Figure 1:
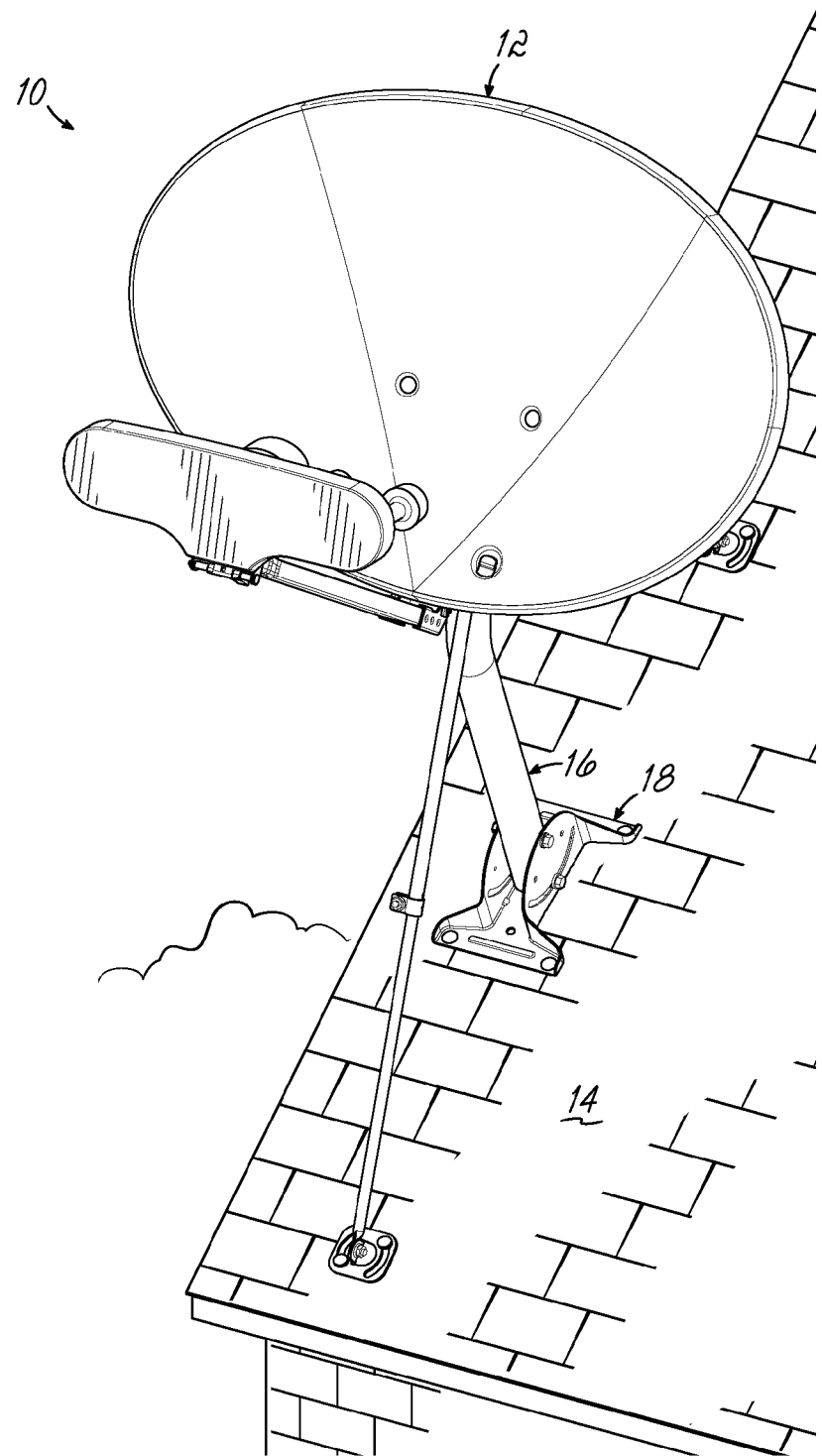
FIG. 1 is a perspective view of a mounting assembly for a satellite dish reflector in accordance with an embodiment of the invention.

FIG. 1 illustrates a satellite dish reflector mounting assembly, in accordance with one embodiment the invention. Specifically, the assembly 10 includes an antenna or reflector dish 12 that is mounted at an obstruction-free or elevated position, such as on a roof surface 14 as shown in the Figure. Of course other mounting locations will be appropriate depending on the installation.

Figure 2:
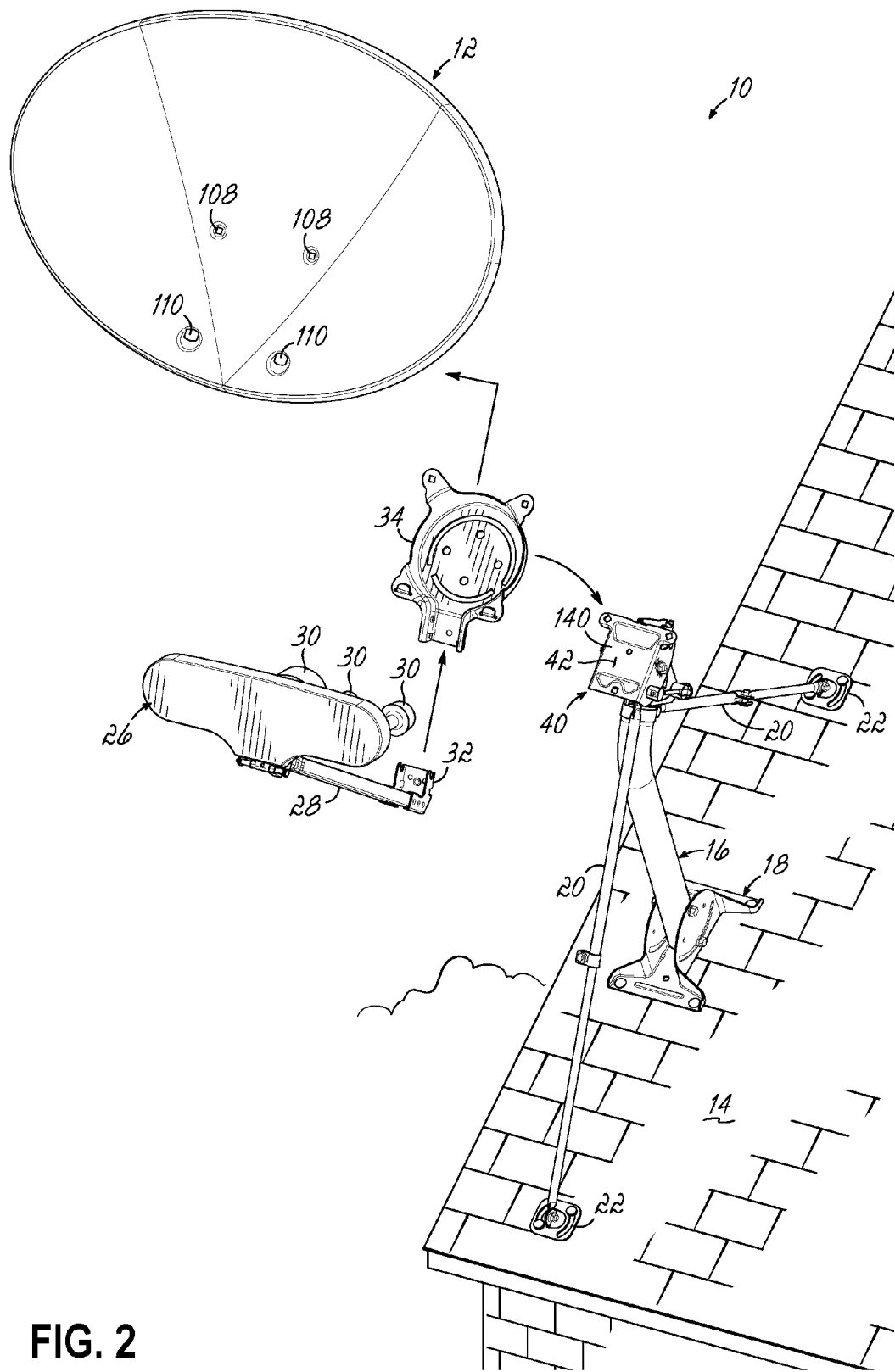
FIG. 2 is an exploded view of the mounting assembly of FIG. 1.

The reflector dish is sized and shaped as conventional for capturing satellite signals and focusing and directing them to one or more feed points associated with the LNB so the signals may be further processed. The reflector dish 12 is held in place at the mounting location by being secured on a mast 16. The mast 16 is elongated and positions the dish away from the mounting surface, such as the roof. The lower end of the mast 16 is incorporated into a foot bracket 18 that is, in turn, secured to the roof surface 14. The bottom end of mast 16 is pivotally and adjustably mounted with the foot bracket 18 for proper angling and orientation of the assembly 10. Referring to FIGS. 1 and 2, one or more support legs 20 are coupled with mast 16 to further support the assembly 10. Appropriate feet 22 mount the legs 20 to the roof surface 14. For example the legs might extend forwardly or rearward or in other directions with respect to the mast for proper mounting.

For receiving the signals captured by the reflector dish 12, an LNB or low noise block converter 26 is coupled to a support arm 28 that extends away from the reflector dish 12. The LNB may be a conventional LNB that incorporates one or more elements 30 to capture the satellite signals reflected from dish 12 for further processing. Generally, the LNB would amplify and down convert the signals, and direct them away from the dish and assembly to the appropriate electronics utilizing one or more cables (not shown). As discussed further hereinbelow, the support arm 28 is coupled with the reflector dish through an elbow bracket 32. The elbow bracket 32 then engages with a reflector bracket 34, which, in turn, engages with and secures the reflector dish 12, in accordance with principles of the invention.

FIG. 2 shows an exploded view of the assembly 10, wherein the reflector bracket 34, which supports the reflector dish 12, as well as the elbow bracket 32, support arm 28 and LNB 26, are mounted to an appropriate adjustable steering mechanism 40 that is supported by mast 16. The steering mechanism is secured to the mast and has an appropriate flat mounting surface 42, which engages with a rear face of the reflector bracket 34 (See FIG. 3). The steering mechanism 40 provides steering of the bracket 34 and reflector dish 12 in both the elevation direction (up and down), and the azimuth direction (side-to-side) across a horizon. As is conventional in steering a satellite dish, the reflector dish 12 is aimed, through the steering mechanism 40, at one or more particular satellites in the sky. The steering mechanism has suitable components for providing such azimuth and elevation adjustments and overall steering of the reflector dish in a conventional manner.

Figure 3:
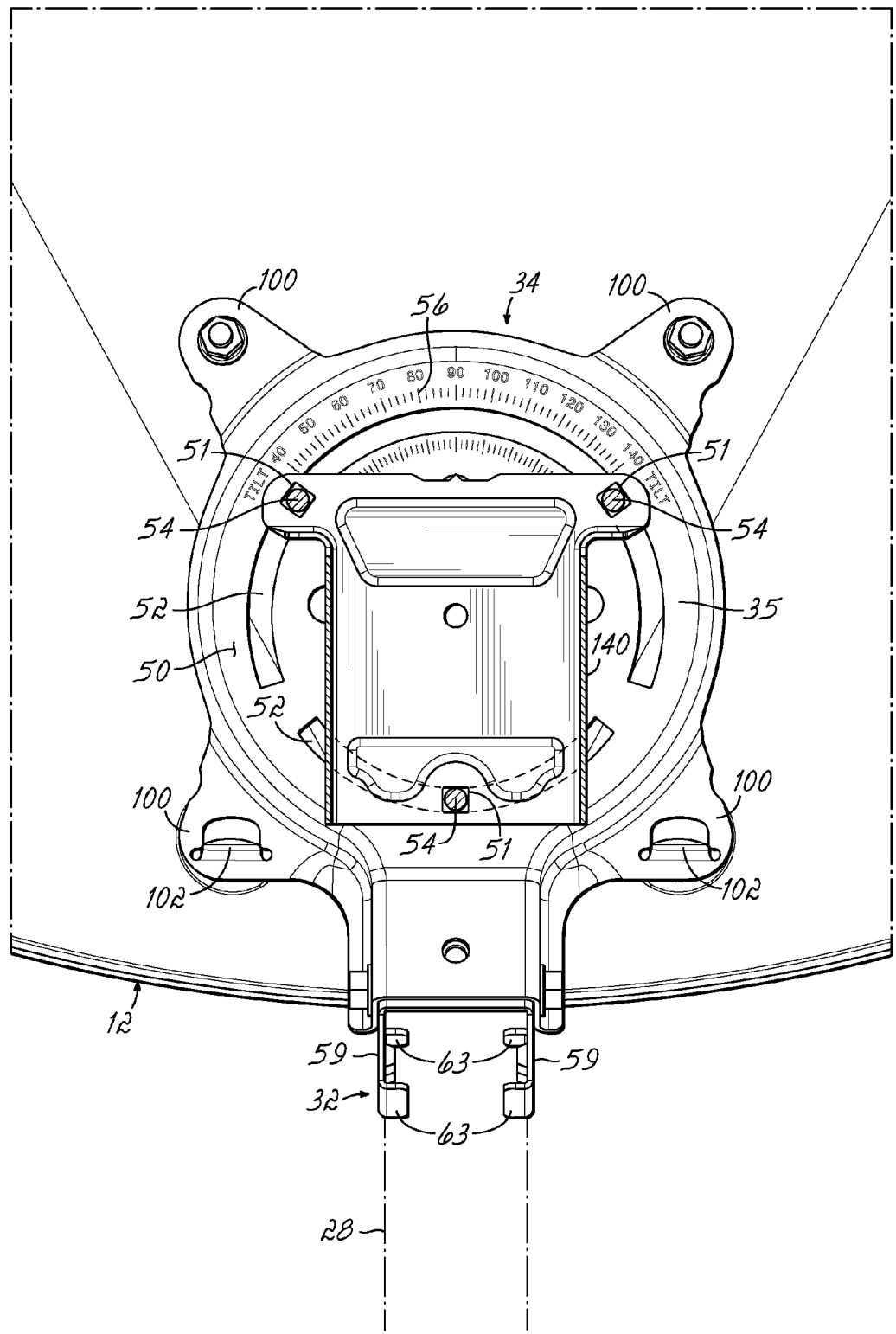
FIG. 3 is a rear view of a portion of the assembly of FIG. 1 showing a dish coupled to a steering mechanism in accordance with an embodiment of the invention.

Referring to FIG. 3-6, reflector bracket 34 has a rear mounting surface 50, which is generally planar and is configured to engage the planar mounting surface 42 of the adjustable steering mechanism. The rear mounting surface 50 is defined by a generally planar rear wall 35 of the bracket 34. FIG. 3 illustrates a rear view of the bracket 34, steering mechanism 40 and dish 12. The planar mounting surface 42 of the adjustable steering mechanism 40 includes a plurality of apertures 51 that are configured to align with respective curved slots 52 that are formed in the rear wall 35 of the reflector bracket 34 when the bracket 34 is positioned on the steering mechanism. Appropriate fasteners 54, such as threaded bolts and nuts, engage the slots 52 and apertures 51 for securing bracket 34 with the steering mechanism 40. The curved slots 52 enable the reflector bracket 34 to rotate appropriately with respect to the adjustable steering mechanism to provide another degree of adjustability to the reflector dish 12. Such an adjustment is generally referred to as a tilt of the antenna, and one or more appropriate scales or indicia 56 might be provided on a surface of the reflector bracket 34 adjacent to the curved slots 52 for a measured tilt adjustment.

In accordance with one embodiment of the invention, the mast 16 and steering mechanism 40 may be appropriately mounted and secured onto a mounting surface, such as a roof surface 14. Thereafter, the reflector bracket 34 may be mounted to the steering mechanism 40 with appropriate fasteners, as illustrated in FIG. 3. Bracket 34 is secured to the mast 16 by securement to mechanism 40. The reflector dish 12 and LNB 26 may then be mounted within the overall assembly.

As may be appreciated, the reflector dish 12 and LNB 26 are two of the heavier, larger and bulkier elements within the assembly 10 that is to be mounted on the roof 14. Furthermore, the size and shape of the reflector dish makes it particularly cumbersome to manipulate and mount at an elevated position. In accordance with one aspect of the invention, the assembly is designed for a more rapid and efficient mounting of both the reflector dish 12 and LNB 26, with a minimal number of apertures and fasteners to align and secure to hold the components together. Furthermore, the present invention provides various support mechanisms that ensure that components may be put together and will stay together temporarily, without being held, while they are more securely coupled, such as with one or more fasteners. Therefore, the current assembly may be installed and mounted more efficiently and rapidly by a single installer. While providing such an improvement over previous assemblies 10, the present invention still maintains a robust and strong securement of both the LNB and reflector dish at the desired location or surface.

Referring to FIGS. 4-8, the reflector bracket 34 and elbow bracket 32 for holding the support arm 28 and LNB 26 are uniquely configured to provide a highly efficient and rapid mounting deployment while maintaining strong support for the LNB, as well as a secure attachment to reflector bracket 34 and the reflector dish 12. The brackets 32, 34 may be formed of an appropriate material, such as SAE J2340 340 XF, high strength low alloy and may be stamped or otherwise formed. Specifically, elbow bracket 32 incorporates an arm support section 60 that is positioned in an angled relationship to a seat section 62 of the bracket 34.

Figure 4:
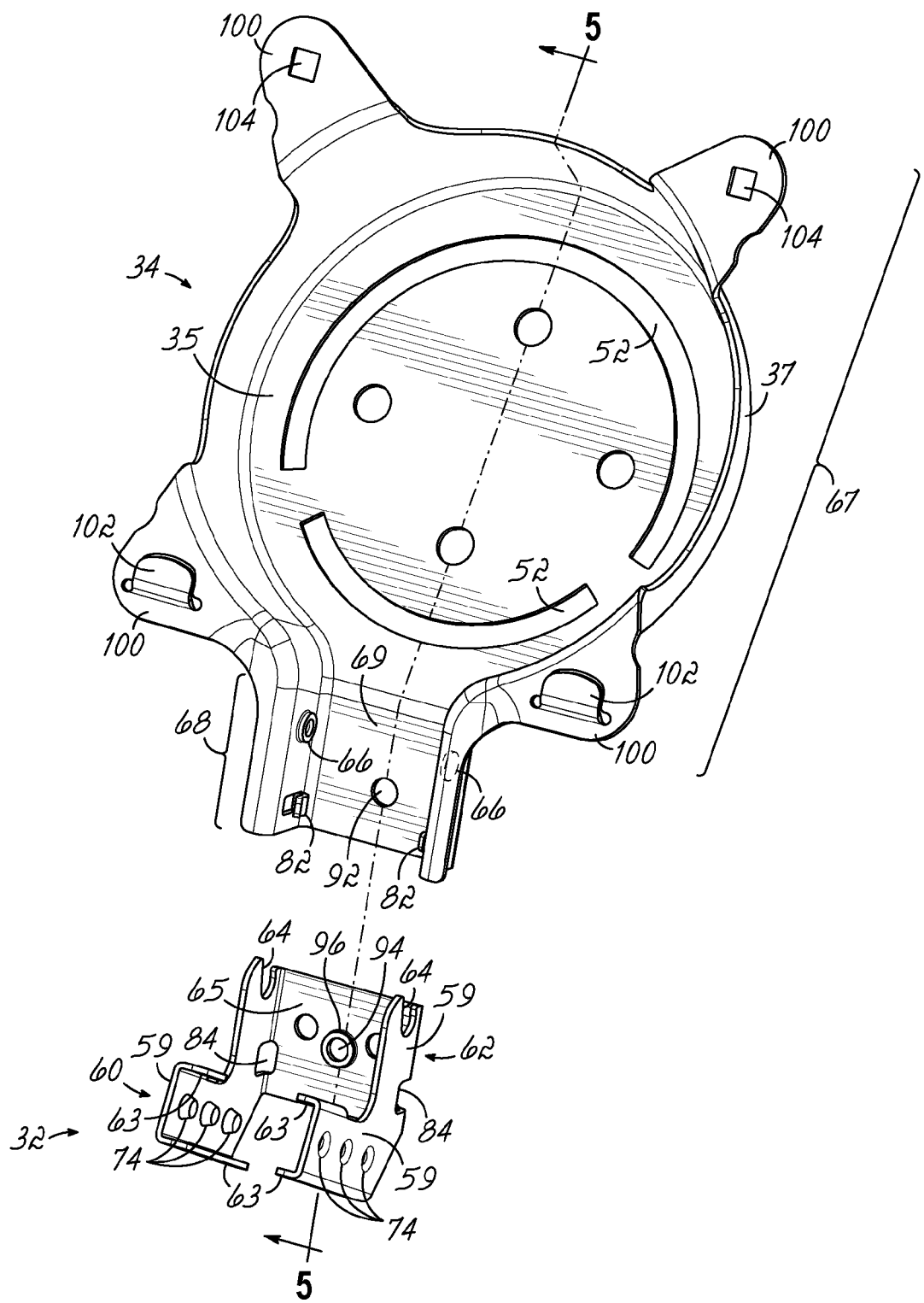
FIG. 4 is a perspective exploded view of a reflector bracket and elbow bracket of a mounting assembly in accordance with an embodiment of the invention.
Figure 5:
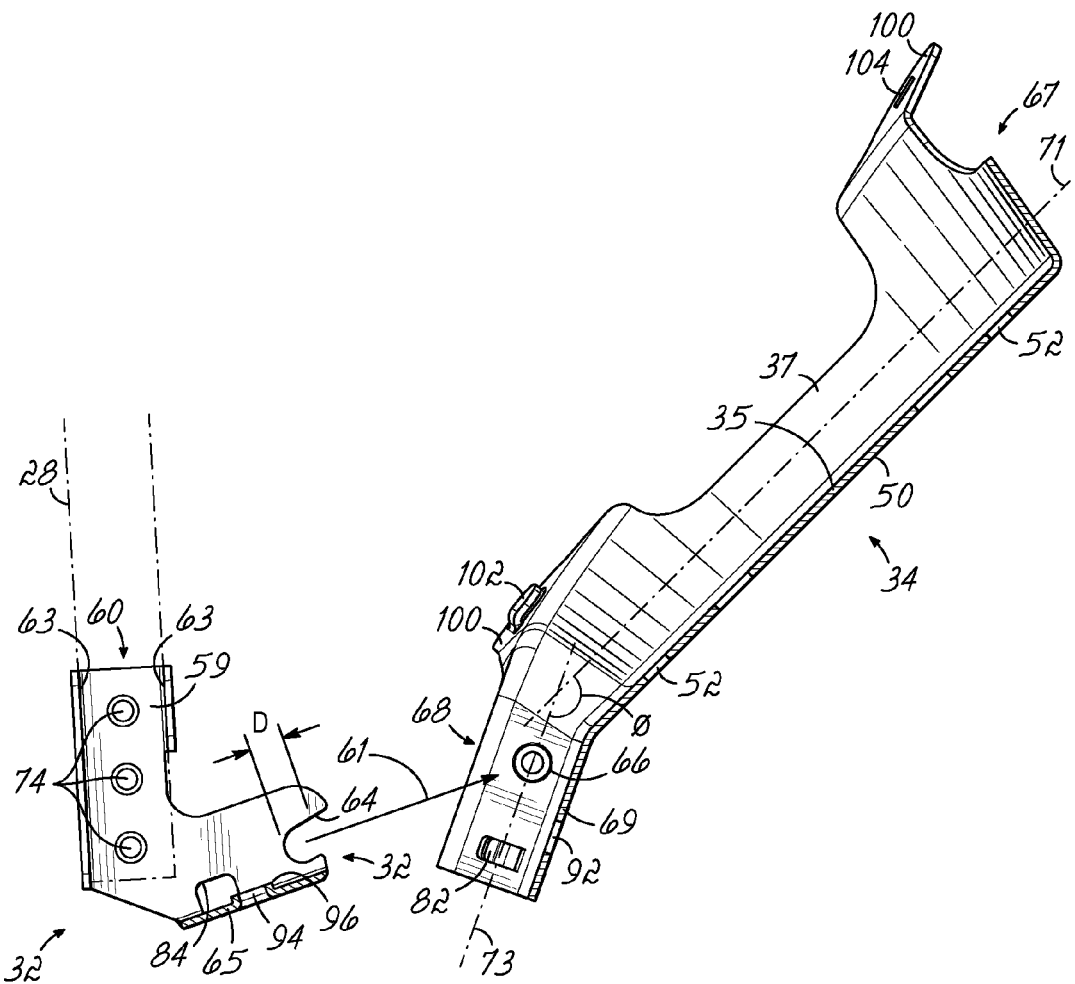
FIG. 5 is a side view in partial cross-section showing engagement between a reflector bracket and elbow bracket in accordance with an embodiment of the invention.
Figure 6:
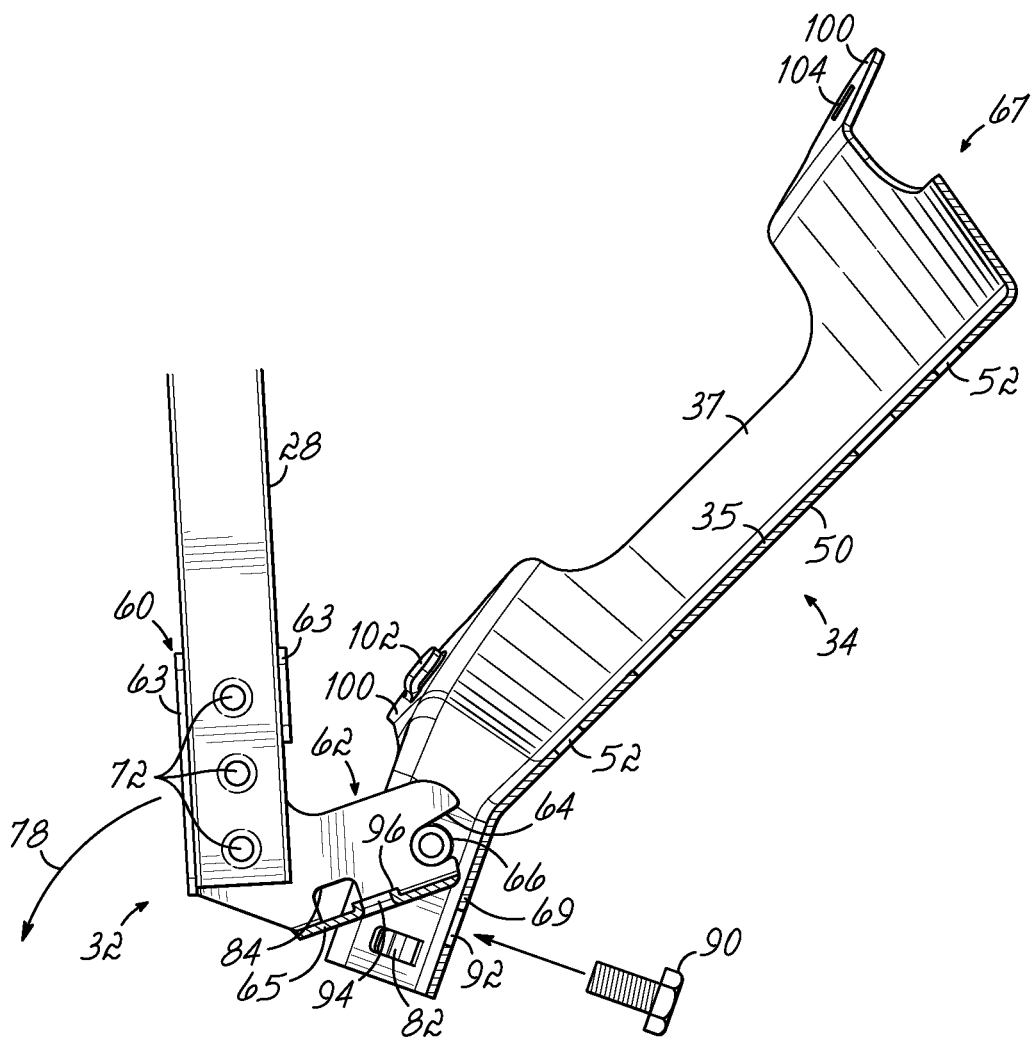
FIG. 6 is another side view in partial cross-section showing engagement between a reflector bracket and elbow bracket of the embodiment of FIG. 5.

As seen in FIG. 4, the arm support section 60 is formed by opposing side walls 59 and angled flanges 63 that are sized and configured to engage and hold a support arm 28. Specifically, as illustrated in FIGS. 4-6, the support arm 28 may be secured with the elbow bracket 32 for installation. In one embodiment, the support arm 28 might include a series of interlocking clinch structures or clinches 72, 74 (eg Tox clinches of TOX PRESSOTECHNIK LLC) that are spaced along the length of support arm 28 proximate the end of the support arm that engages the elbow bracket. The clinch structures 72, 74 are formed together and cooperate to secure the support arm and the elbow bracket together. The support arm 28 can be located within the flanges 63 of the elbow bracket and held in a fixed position for the clinch formation process, that clinch the corresponding surfaces on the arm 28 and the elbow bracket side wall 59. The clinch process interlocks the two elements together. The elements 72 and 74 correspond to the opposing sides of the clinch joint as illustrated in the Figures. In that way, the support arm 28 and LNB 26 are securely held in an angular relationship with respect to the seat section 62 of the elbow bracket that will engage the reflector bracket.

Figure 7:
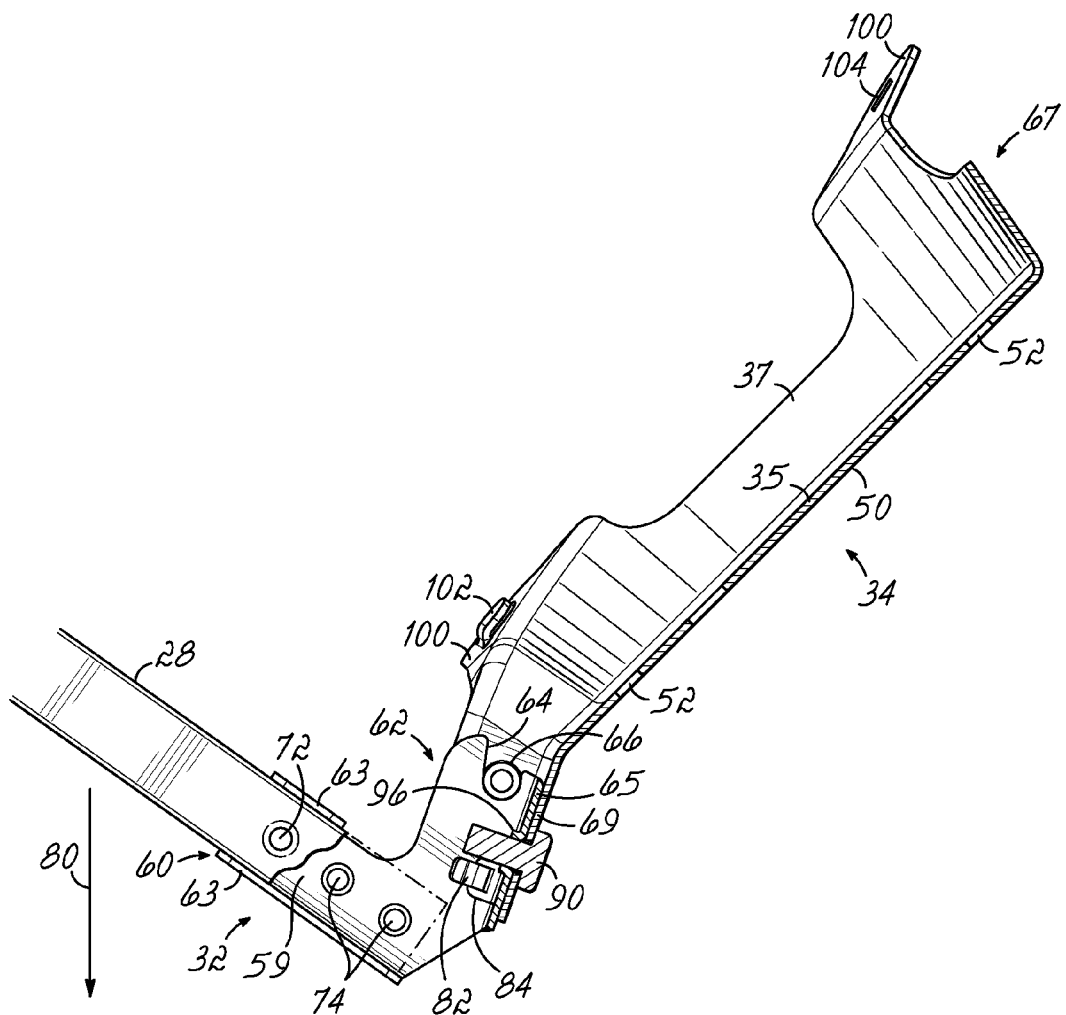
FIG. 7 is another side view in partial cross-section showing engagement between a reflector bracket and elbow bracket of the embodiment of FIG. 5.

Referring to FIGS. 5-7, the seat section 62 engages with the reflector bracket 34 and is secured thereto for securing the support arm 28 and LNB 26 with the reflector dish. The seat section 62 of bracket 34 includes a rear wall 65 and side walls 59 that coincide with the side walls 59 of the arm support section 60 as shown in FIG. 4. During installation, the elbow bracket 32 might be secured with the reflector bracket 34 and then the arm 28 and LNB might be secured with the elbow bracket 32. Alternatively, the arm and LNB might be secured to the elbow bracket 32, which is then engaged with the reflector bracket.

Referring again to FIGS. 4-6, the seat section 62 of the elbow bracket incorporates guide slots 64 that are formed in the side walls 59 on either side of the elbow bracket and opposing sides of the seat section 62. The guide slots 64 are positioned at one end of the seat section 62 that is opposite the arm support section 60. Each of the guide slots is configured to engage a respective boss 66 that is formed in the reflector bracket.

The reflector bracket 34 is formed or stamped into cup-like structure having a rear wall 35 and a side wall 37 that extends from the rear wall and extends around the rear wall. The rear wall 35 and side wall 37 define a reflector seat 67 for engaging the reflector dish 12. The bracket 34 also includes an arm seat 68 that has a rear wall 69 and includes portions of the sidewall 37 of the bracket 34. The arm seat 68 engages the elbow bracket 32 and arm 28. The rear wall 69 and connected portions of the side wall 37 that form the arm seat are shown in the illustrated embodiment as being continuous with the rear wall 35 and side wall 37 of the reflector seat 67. The overall reflector bracket can be appropriately formed and stamped or those portions might be separate portions that are operably coupled together for the purposes of coupling the LNB and the reflector dish.

Referring to FIG. 5, the arm seat 68 is angled with respect to the reflector seat to define the appropriate angle and alignment of the LNB and support arm with respect to the reflector dish. The alignment ensures that signals reflected from the reflector dish 12 are appropriately and efficiently captured by the LNB. A plane 71 is defined by the reflector seat 67, and in one embodiment, the arm seat 68 extends, in one embodiment, generally at an angle $\phi$ of 154.50° with respect to the plane 73 of the reflector seat. Depending on the reflector dish arrangement and LNB orientation, other angles might be utilized.

The bosses 66 in the arm seat 68 are positioned along the inside surface of the side wall 37 portions of the arm seat 68. The bosses 66 and are appropriately formed in the reflector bracket 34 and might be formed by an up-struck, extruded or stamped portion of the reflector bracket side wall 37. In the illustrated embodiment, the bosses are formed on opposite sides or opposite side walls 37 of the arm seat 68. As shown, the arm seat 68 is configured to receive the seat section 62 of the elbow bracket. Referring to FIGS. 5 and 6, the elbow bracket, and particularly the seat section 62 of the elbow bracket may be angled appropriately during installation to expose the guide slots 64 to the bosses 66. The seat section 62 may then be slid in the direction of arrow 61 toward arm seat 68 in the reflector bracket so that the guide slots 64 engage and partially surround the respective bosses 66. The side walls 59 of the seat section 62 of the elbow bracket engage the side wall 37 of the reflector bracket when the seat section 62 slides into the arm seat 68. The guide slots partially surround the respective bosses 66 and are sized and configured to be rotated around the bosses when engaged therewith. In that way, as illustrated in FIGS. 6 and 7, once the bosses are seated in the guide slots, the arm 28 and elbow bracket 32 might be rotated in the direction of arrow 78 for seating the seat section 62 of the elbow bracket within the arm seat 68 of the reflector bracket.

In accordance with another feature of the invention, the bosses and guide slots operate to temporarily secure the support arm with the reflector bracket until those components can be more permanently secured together. Therefore, the installer does not have to hold the components together once they are properly seated. This provides a significant advantage and efficiency in the installation process. The guide slots 64 are configured to have an effective depth D to capture and hold the bosses and to hold the elbow bracket within arm seat 68 when the bosses are positioned in the guide slots and the elbow bracket is rotated as shown in FIG.

6. In that way, the bosses 66 act as a pivot point such that a downward force in the direction of arrow 80 on the support arm 28 and elbow bracket 32 will be translated to drive the seat section 62 into the arm seat 68 and to hold the elbow bracket engaged with the seat 68. The rear wall 65 of the seat section 62 of the bracket is held against the rear wall 69 of the arm seat 68. This provides a robust support of the support arm 28 and the LNB 26 with the bracket 34 and reflector dish. (See FIG. 7)

In accordance with another aspect the invention, to ensure the components stay seated and the bosses 66 stay properly positioned and engaged with the respective guide slots 64 when mounting the support arm and LNB to the assembly 10, arm seat 68 also includes opposing tabs 82 that are positioned in the seat 68 on the opposing sidewall 37 portions that form the arm seat 68. The tabs 82 are located vertically below the bosses 66 in the arm seat 68 and project inwardly in the arm seat 68. The support tabs are configured to slide into respective support slots 84 that are formed in the opposing seat section 62 of the elbow bracket when the elbow bracket is rotated (See FIGS. 6-7). The support slots are formed as cut-outs on the inside surface of the side walls 59 of the seat section, below the guide slots 64. Specifically, as illustrated in FIGS. 4-6, when the guide slots 64 are positioned around bosses 66 and the elbow bracket 32 is rotated into engagement with the arm seat 68 of reflector bracket 34 for seating, the support tabs 82 are brought into engagement with the respective support slots 84. The support tabs 82 extend inwardly through the slots from an inside surface of the respective side walls 37 of the seat 68 as noted, and thus protrude into the support slots 84 along the insides surface of respective side walls 59 of the seat section 62. The support tab engagement is illustrated in a partial cross-section of FIG. 7 as well as FIG. 8.

Once the brackets 32 and 34 are seated together and the support tabs 82 are engaged with the support slots 84, the tabs operate to prevent the elbow bracket from sliding vertically out of the arm seat of the reflector bracket and prevent the guide slot 64 from coming away from and disengaged from the respective bosses 66. In that way, downward forces on the arm in the direction of arrow 80 (See FIG. 7) are directed to the seat section 62, and then to seat 68 of the reflector bracket due to rotation of the elbow bracket around the bosses. The bosses provide a hinge point for the engagement of the elbow bracket and reflector bracket. The support tabs 82 cooperate with the guide slots 64 and bosses 66 to lock the seat section 62 and the elbow bracket with the reflector bracket. In that way, any force or weight on the support arm and LNB operates to more securely seat the elbow bracket and support arm with the reflector bracket and maintains the arm and LNB with the reflector bracket temporarily without requiring any fasteners. An installer can thus readily seat the brackets together during installation and then let go of the support arm and LNB assembly.

Accordingly, in accordance with one feature of the invention, the LNB 26 and support arm 28 can be mounted with the reflector bracket quickly and efficiently without the need for fasteners. This provides a significant advantage over prior mounting assemblies, wherein holes and apertures must be aligned and held in place while fasteners are engaged with the holes or apertures. With prior assemblies, two installers were necessary. Or at a minimum, two arms were often required for mounting the LNB with the antenna, with one hand holding the components in position with their corresponding apertures aligned, and the other hand manipulating fasteners into the aligned apertures or openings for securing the elements together. As may be appreciated, depending upon the way the LNB and support arm and the tolerances in the engagement between the reflector dish bracket and the LNB mounting assembly, the task could be particularly difficult, and possibly dangerous given the fact that both hands must now engage the components of the antenna assembly rather than holding onto a support surface or support element for securing the installer at their elevated position or rooftop.

Referring again to FIG. 5-7, the support arm 28, LNB 26 and elbow bracket of the invention might be manipulated by a single hand, wherein the guide slots 64 are brought into alignment with the bosses 66 (See FIG. 5). Then, the support arm might be rotated around the bosses 66 so that the support slots 84 are brought into engagement with the support tabs 82. Once seated, as shown in FIG. 7, the LNB, support arm, and elbow bracket are also all secured to the reflector bracket without any need for further support. This provides a significant advantage and efficiency in the installation, and speeds up the installation process as well as simplifying it. No specific alignment of apertures is necessary, as the engagement guide slots 64 the bosses 66 ensure proper alignment and proper seating of seat section 62 with seat 68 and the reflective bracket.

Once the elbow bracket 32 is properly seated in the reflector bracket as illustrated in FIG. 7, a single fastener 90 is positioned to secure seat section 62 with seat 68, and thus, secure the elbow bracket with the reflector bracket. As illustrated, apertures 92, 94 are formed in the respective seat 68 and seat section 62, and are aligned when the bosses 66 engaged the guide slots 64, and the elbow bracket is rotated into seated engagement, as illustrated in FIG. 7. Fastener 90, such as a bolt, might be secured with a nut, as appropriate. Alternatively, aperture 94 might include a threaded boss 96, which is configured for threaded bolt 90 to engage therewith from the rear surface of the reflector bracket 34 (See FIG. 7). In that way, the reflector bracket 34 and elbow bracket 32 are securely seated for securing support arm and LNB with the reflector dish in the assembly 10. As such, the present invention provides complete securement and mounting of the LNB and support arm with the reflector dish without requiring alignment of opposing apertures and the positioning of a plurality of fasteners in the aligned apertures for securing components together. Additionally, the LNB is mounted with the reflector dish with only a single separate fastener in the form of bolt 90. This presents not only a significant time savings in the assembly process, but also reduces the cost by reducing various parts previously necessary.

Figure 8:
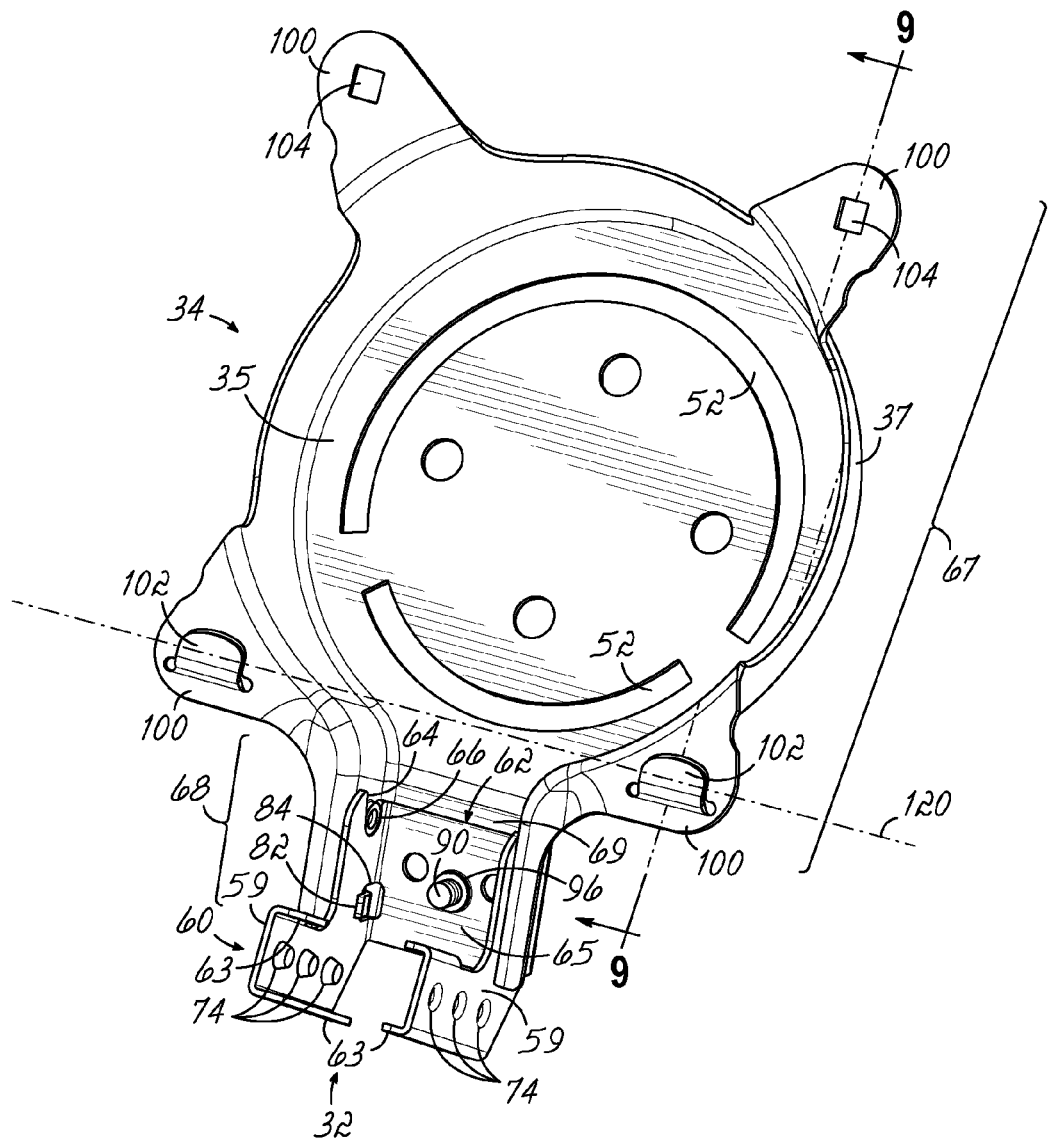
FIG. 8 is a perspective view a reflector bracket and elbow bracket coupled together in accordance with the mounting assembly embodiment of FIG. 4.
Figure 9:
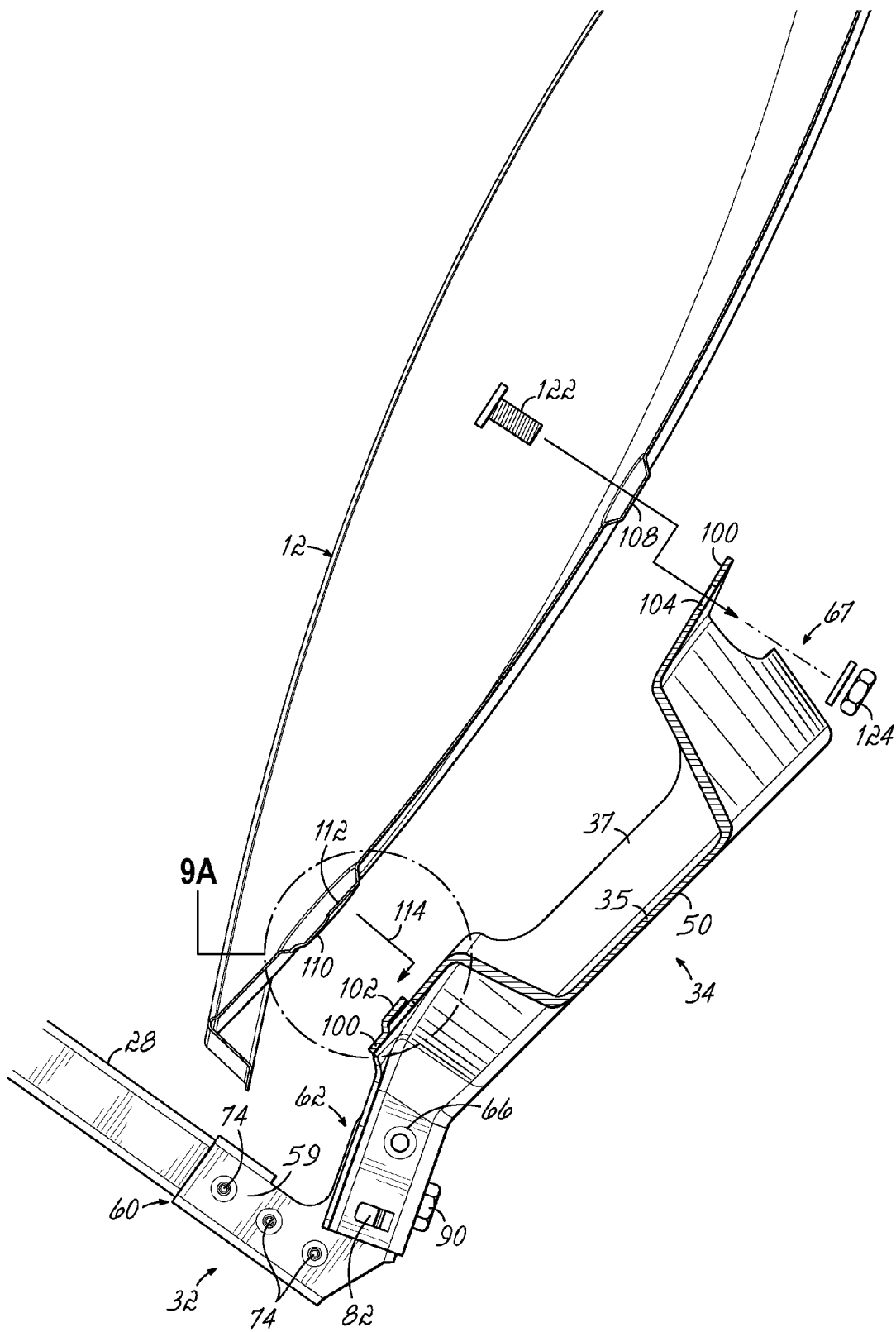
FIG. 9 is side view, in partial cross-section, illustrating a reflector dish coupled with the mounting assembly in accordance with an embodiment of the invention.

Referring to FIGS. 7-9, in accordance with another aspect of the invention, the reflector bracket 34 also incorporates rapid attachment features for assisting an installer in mounting and securing the reflector dish to the bracket. Specifically the reflector bracket is configured for temporarily supporting the reflector disk before it is permanently secured, thus, allowing an installer to initially position the reflector dish 12 on the reflector bracket 34, and then release the reflector dish. The installer may then focus on subsequently securing and aligning a couple of fasteners for more permanently securing the reflector dish with a bracket. This further saves time, increases safety and reduces components in the installation.

Referring to FIG. 8, reflector bracket 34 is shown and is configured with four corner elements 100 that extend outwardly from side wall 37 around the periphery of the bracket. The corner elements are in general alignment with the plane 71 of the bracket for mounting the reflector (See FIG. 5) and provide four effective corners on the bracket 34. The corner elements 100 include features for engaging the reflector dish 12. Specifically, the lower corner elements 100 incorporate reflector tabs 102 that extend upwardly and forwardly from the corner elements 100 and the rear wall 35 of bracket 34. In one embodiment of the invention, the reflector tabs 102 might be up-struck from the metal forming the bracket 34 and the corner elements 100. The upper corner elements 100 include apertures 104 for engaging appropriate fasteners.

As illustrated in FIG. 9, once the reflector bracket 34 has been appropriately connected with elbow bracket 32 and the LNB support arm 28 assembly 10 is then ready to receive and secure the reflector dish 12. To that end, as shown in FIGS. 2 and 9, the reflector dish 12 is appropriately configured to engage the reflector bracket 34 for securement. The reflector dish includes two lower slots and two upper apertures 108. The lower slots are configured to engage with and receive the reflector tabs 102, and the apertures 108 then are subsequently aligned with the apertures 104 in the reflector bracket 34. The reflector bracket 34 and reflector dish of the invention provide an initial engagement and temporary mounting of the dish for initially positioning and supporting the reflector dish. The installer can then release the dish and focus on a more permanent attachment of the reflector dish 12 to the reflector bracket 34 and assembly.

Figure 9A:
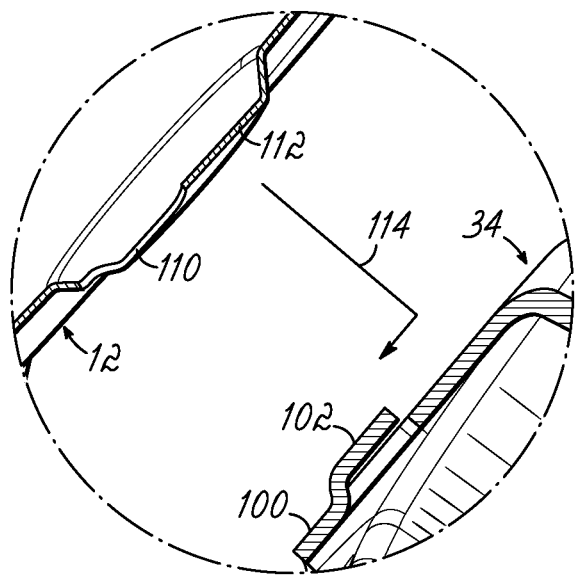
FIGS. 9A and 9B are expanded detail views along the lines of 9A, as shown in FIGS. 9 and 9B as shown in FIG. 10.
Figure 9B:
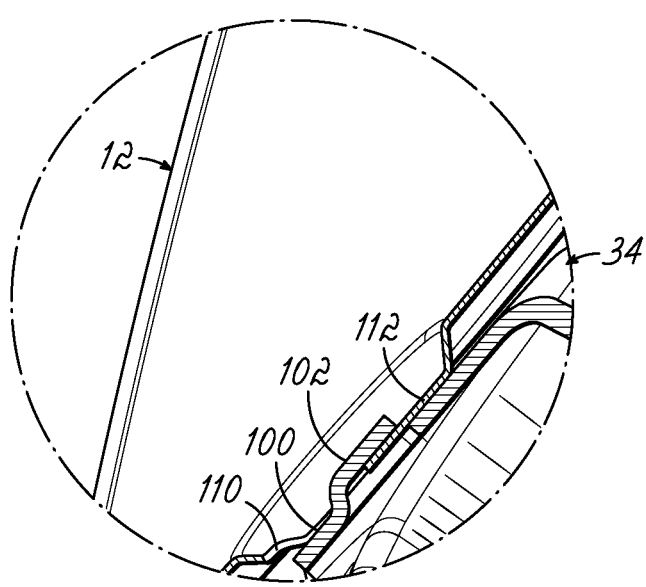

Referring now to FIGS. 9A and 9B, reflector dish 12 is initially positioned so that the reflector tabs 102 engage slots 110 formed in the dish. The slots 110 are formed by a recessed portion within dish 12 that includes a slot wall 112. Specifically, as illustrated in FIG. 9A, as shown by arrow 114, the reflector dish may be positioned so that slot 110 is moved against the bracket 34 and receives tab 102. The reflector dish is then slid downwardly on the bracket, as illustrated by arrow 114, so that wall 112 of the slot engages the tab 102. (See FIG. 9B) Both slots 110 of the reflector dish are positioned over respective tabs 102 of the bracket 34. The weight of the dish and the angle of bracket 34 ensure that the wall 112 is directed downwardly against the respective reflector tab 102 and the tabs support the reflector dish through engagement with the respective slots 110. As illustrated, two reflectors tabs 102 are utilized in the disclosed embodiment, but a greater or lesser number of reflector tabs and appropriate slots might be utilized.

Referring to FIG. 9B, as noted, once the reflector tabs have been engaged with the appropriate slots 110 in the dish 12, the weight of the dish 12 and the particular angular orientation of the reflector bracket 34 ensure that the slot walls 112 remain engaged appropriately with reflector tabs 102. In that way, an installer may temporarily position the dish 12 on bracket 34, and have it remain in position and supported by the bracket 34 until it is more permanently secured with the bracket. This presents a significant improvement in installation efficiency, as a dish can be positioned and will generally remain in place without requiring the alignment of apertures and the utilization of individual fasteners to secure the dish with the reflector bracket. In the past, the dish 12, and apertures therein, had to be aligned with apertures in the reflector bracket, and then separate fasteners had to be positioned in the aligned apertures and secured. As such, installation of the reflector dish 12 was often a two-person job to ensure that an installers can safely remain at the elevated installation position while doing the installation. With prior assemblies, one installer had to hold the dish while the other installer manipulated the fasteners.

Figure 10:
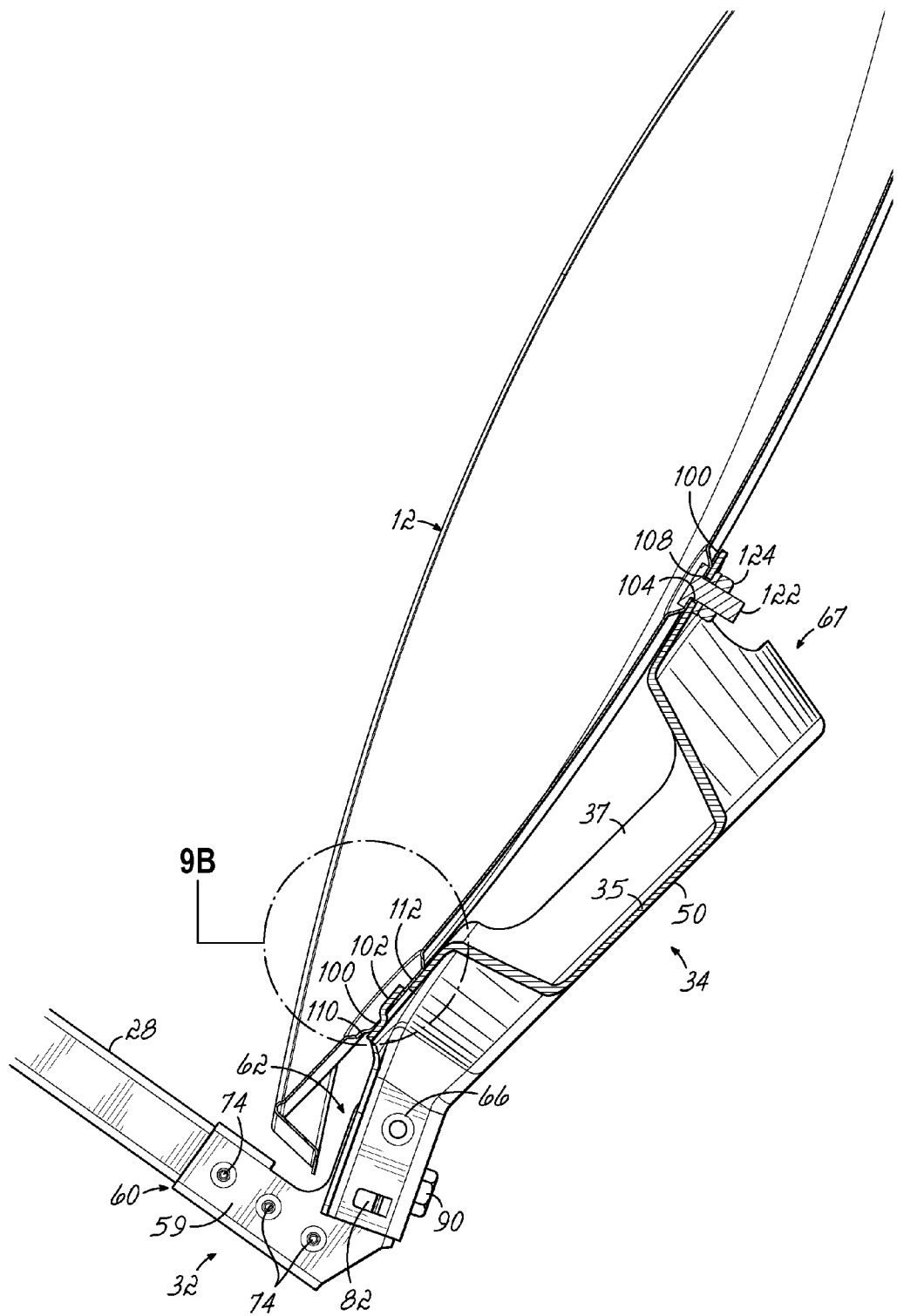
FIG. 10 is a side view similar to FIG. 9 illustrating a reflector dish mounted in the mounting assembly in accordance with an embodiment of the invention.

In accordance with another aspect of the invention, the reflector tabs 102 are configured on bracket 34 to be linearly aligned across the bottom of the bracket 34, along line 120, as illustrated in FIG. 8. Once dish 12 has been positioned on bracket 34 as illustrated in FIGS. 9-10, the apertures 104 and bracket 34 are then generally properly aligned with apertures 108 for receipt of one or more fasteners 122 to more permanently secure dish 12, as illustrated in FIGS. 9 and 10. In that way, implementing the reflector tabs 102 further simplifies the installation by eliminating the requirement that the installer manually support the dish 12 while seeking to align apertures 104 and 108. With the reflector tabs 102 supporting dish 12, the apertures will generally be in alignment and ready to receive appropriate fasteners, which may include a bolt 122 that cooperates with an appropriate nut 124 on the rear side of the dish, as illustrated in FIG. 10. By incorporating the two fasteners 122, the dish is permanently secured in the assembly 10. Furthermore, the reflector tabs 102 provide securement of the dish at the bottom corner elements 100, thus eliminating the need for fasteners. As such, there is a cost savings also provided by the inventive assembly, in addition to the significant gains in installation efficiency. Once dish 12 is permanently secured, the dish may be then steered or aimed at the appropriate satellite(s).

Figure 11:
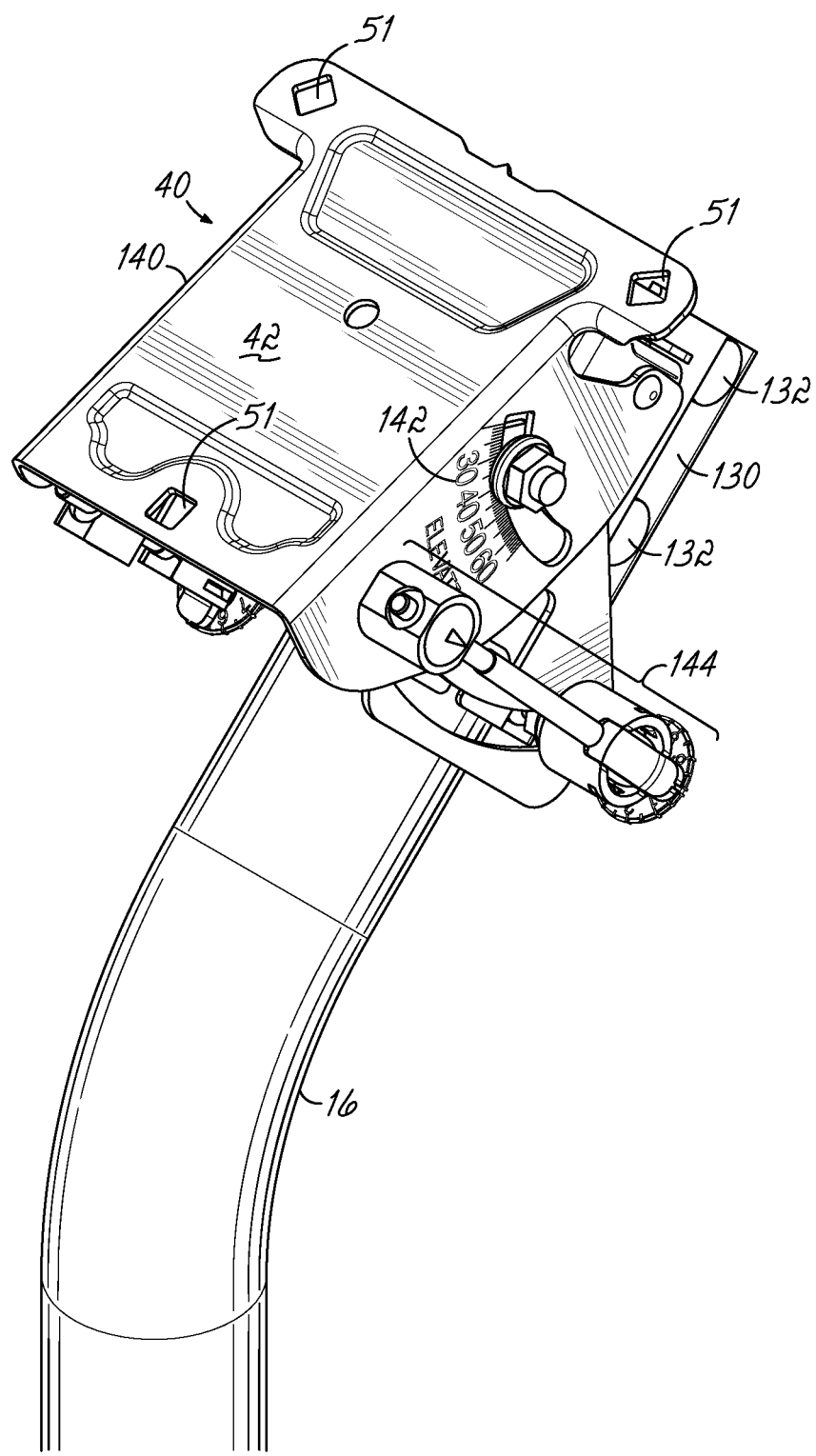
FIG. 11 is a perspective view of a steering mechanism of an embodiment of the invention illustrating elevation adjustment features.
Figure 12:
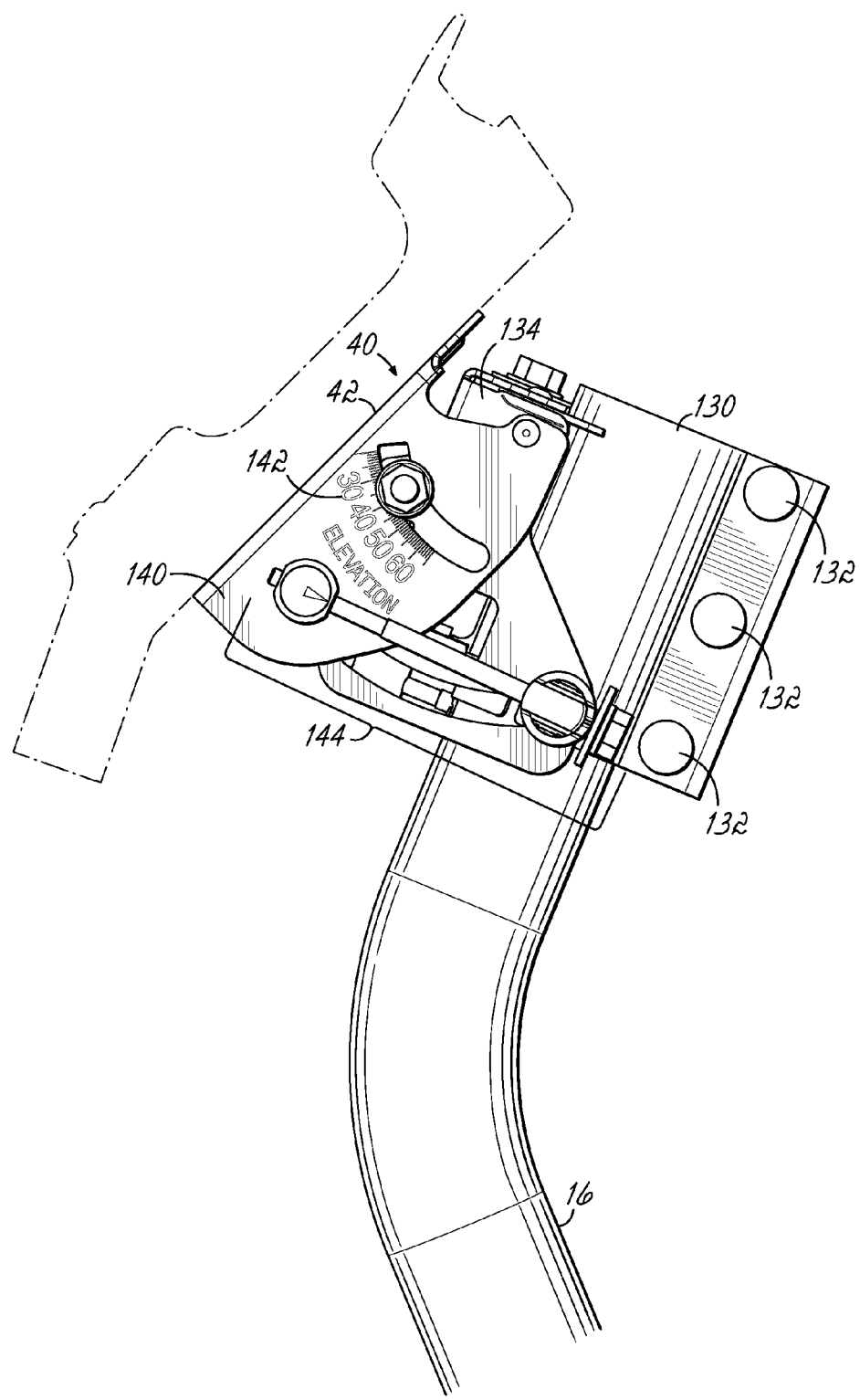
FIG. 12 is a side view of the steering mechanism of FIG. 11.
Figure 13:
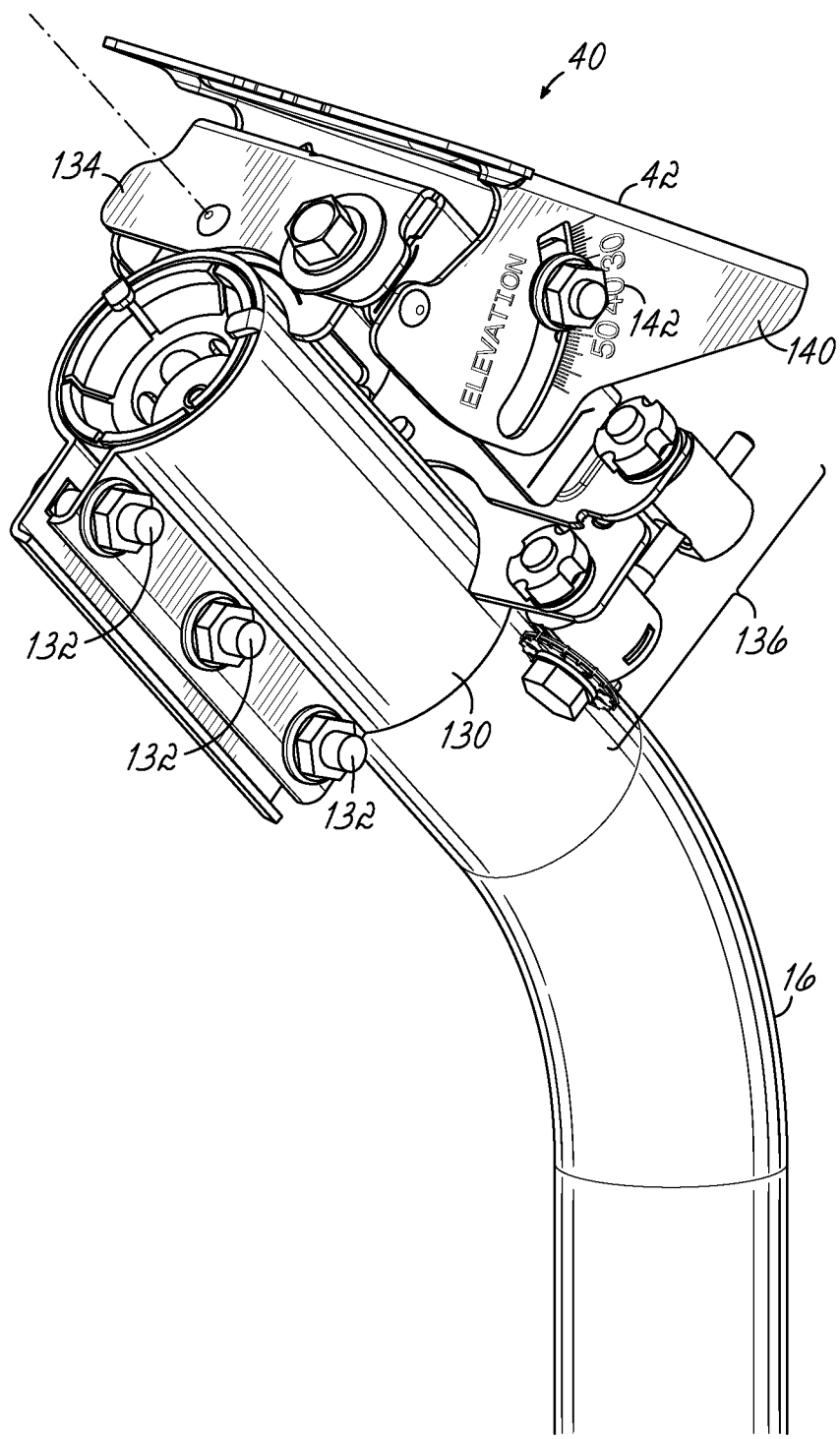
FIG. 13 is perspective view of a steering mechanism of an embodiment of the invention illustrating azimuth adjustment features.
Figure 14:
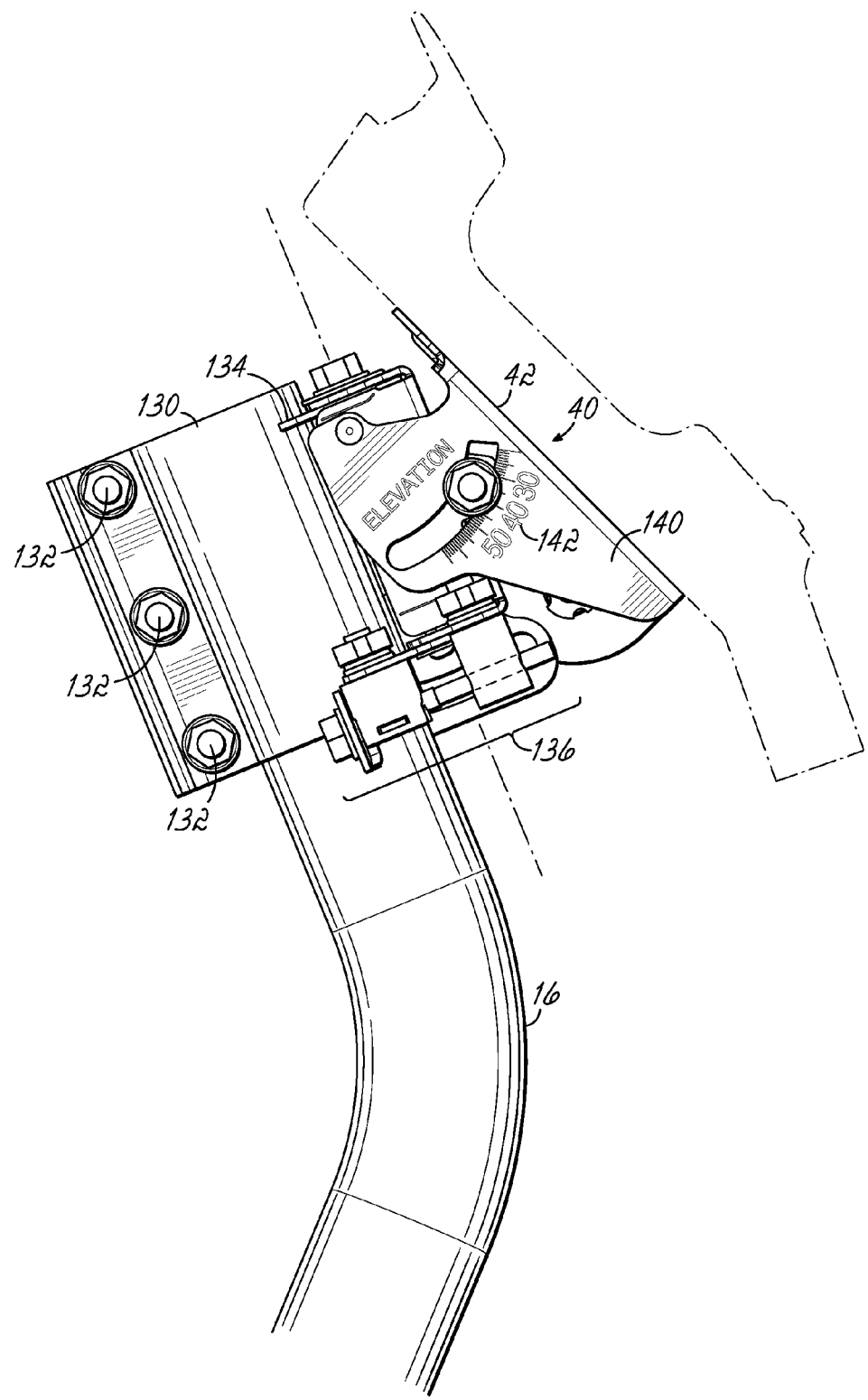
FIG. 14 is a side view of the steering mechanism of FIG. 13.

To that end, referring to FIGS. 11-14, one example of an adjustable steering mechanism 40 is illustrated in accordance with one embodiment of the invention. Such a steering mechanism 40 provides adjustment in both elevation and azimuth for steering the reflector dish. The mechanism 40 attaches to the mast 16. For example, the mechanism 40 might incorporate a clamp or sleeve 130 that is clamped by appropriate fasteners 132, around the mast 16, as illustrated in FIG. 13. An azimuth bracket 134 is coupled with clamp 130 such as by being welded thereto, and the rotation of clamp 130 and bracket 134 provides a gross adjustment of azimuth to mechanism 40 and dish 12. A finer, more precise adjustment of azimuth is provided by adjustment mechanism 136, as illustrated in FIGS. 13 and 14.

For elevation, an elevation bracket 140 is appropriately coupled with the azimuth bracket 134. Elevation bracket 140 rotates with respect to the azimuth bracket 134, as illustrated by the slot indicia 142 in order to provide a gross elevation adjustment. A more refined elevation adjustment is provided by adjustment mechanism 144, as illustrated in FIGS. 11 and 12. In that way, the reflector dish 12 may be steered appropriately in azimuth and elevation for pointing to one or more satellites. As further illustrated in FIGS. 11 and 12, the elevation bracket 140 includes a section that defines the appropriate planar mounting surface 42 and apertures 51 for coupling with reflector bracket 34, and securing a reflector bracket, as illustrated in FIG. 3.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A reflector dish assembly comprising:
a support structure;
a reflector dish;

a reflector bracket configured for coupling against the reflector dish to mount the reflector dish to the support structure;

a support arm for supporting at least one electronic device at one end of the support arm to receive signals from the reflector dish;

an elbow bracket configured for coupling with another end of the support arm and for securing the one end of the support arm forwardly of the reflector dish, the elbow bracket including a seat section configured for engaging with the reflector bracket;

the reflector bracket including a seat configured to receive the elbow bracket seat section to couple the elbow bracket and reflector bracket together, the seat having at least one boss extending on a side thereof and at least one support tab formed in the seat and spaced linearly from the at least one boss;

the elbow bracket seat section including at least one guide slot formed therein that is configured for sliding over the at least one boss of the reflector bracket seat when the seat receives the seat section;

the elbow bracket seat section further including at least one support slot configured for receiving the at least one support tab of the reflector bracket seat when the seat receives the seat section for securing the at least one guide slot with the at least one boss and coupling the elbow bracket and the reflector bracket.

2. The assembly of claim 1 wherein the reflector bracket seat includes a plurality of bosses and the elbow bracket includes a plurality of guide slots to slide over respective bosses for coupling the elbow bracket and reflector bracket.

3. The assembly of claim 1 wherein the reflector bracket seat includes a plurality of support tabs and the elbow bracket seat section includes a plurality of support slots to receive respective support tabs.

4. The assembly of claim 1 further comprising at least one aperture formed in the seat of the reflector bracket and at least one aperture formed in the seat section of the elbow bracket, the apertures positioned in the respective brackets to align for receiving a fastener when the elbow bracket seat section is received by the seat of the reflector bracket.

5. The assembly of claim 4 further comprising a threaded portion positioned with at least one of the elbow bracket aperture or the reflector bracket aperture for receiving a threaded fastener.

6. The assembly of claim 1 further comprising clinch structures formed in the elbow bracket and support arm to secure the elbow bracket and the another end of the support arm together.

7. The assembly of claim 1 wherein the support structure is a mast.

8. The assembly of claim 1 wherein the elbow bracket is configured for rotatably engaging with the reflector bracket so the seat receives the seat section, and the at least one guide slot rotating around the at least one boss when the elbow bracket is rotated for engaging with the reflector bracket.

9. The assembly of claim 1 wherein the reflector bracket includes a plurality of corner elements configured for engaging the reflector dish, at least one of the corner elements including a tab configured for engaging a slot that is formed in the reflector dish to support the dish, at least one of the corner elements including an aperture configured for aligning with an aperture in the reflector dish to receive a fastener, when the corner element tab engages a reflector dish slot.

10. The assembly of claim 1 further comprising four corner elements, with tabs included in a pair of corner elements and an aperture included in a pair of corner elements.

11. A mounting assembly for securing a reflector dish with electronics, the assembly comprising:

a reflector bracket configured for mounting with a reflector dish to support the reflector dish;

an elbow bracket configured for coupling with an end of a support arm having electronics thereon, the elbow bracket including a seat section configured for engaging with the reflector bracket for securing a support arm in relation to a reflector dish;

the reflector bracket including a seat configured to receive the elbow bracket seat section to couple the elbow bracket and reflector bracket together, the seat having at least one boss extending on a side thereof;

the elbow bracket seat section including at least one guide slot formed therein that is configured for sliding over the at least one boss of the reflector bracket seat when the seat receives the seat section;

at least one support tab positioned on one of the elbow bracket and reflector bracket and at least one support slot positioned on the other of the elbow bracket and reflector bracket, the at least one support slot configured for receiving the at least one support tab when the seat receives the seat section for and securing the at least one guide slot with the at least one boss and coupling the elbow bracket and the reflector bracket.

12. The mounting assembly of claim 11 wherein the reflector bracket seat includes the at least one support tab and the elbow bracket seat section includes the at least one support slot.

13. The mounting assembly of claim 11 wherein the reflector bracket seat includes a plurality of bosses and the elbow bracket seat section includes a plurality of guide slots to slide over respective bosses for coupling the elbow bracket and reflector bracket.

14. The mounting assembly of claim 12 wherein the reflector bracket seat includes a plurality of support tabs and the elbow bracket seat section includes a plurality of support slots to receive respective support tabs.

15. The mounting assembly of claim 11 further comprising at least one aperture formed in the seat of the reflector bracket and at least one aperture formed in the seat section of the elbow bracket, the apertures positioned in the respective brackets to align for receiving a fastener when the elbow bracket seat section is received by the seat of the reflector bracket.

16. The mounting assembly of claim 11 wherein the reflector bracket includes a plurality of corner elements configured for engaging the reflector dish, at least one of the corner elements including a tab configured for engaging a slot that is formed in the reflector dish to support the dish, at least one of the corner elements including an aperture configured for aligning with an aperture in the reflector dish to receive a fastener, when the corner element tab engages a reflector dish slot.

17. The mounting assembly of claim 11 further comprising four corner elements, with tabs included in a pair of corner elements and an aperture included in a pair of corner elements.

18. A mounting assembly for securing a reflector dish, the assembly comprising:

a support structure;

a reflector dish having at least one slot therein and at least one aperture;

a reflector bracket configured for coupling with the reflector dish for mounting the reflector dish to the support structure;

the reflector bracket including a plurality of elements thereon configured for engaging the reflector dish, at least one of the elements including a tab configured for engaging a slot of the reflector dish to support the dish, at least one of the elements including an aperture configured for aligning with an aperture in the reflector dish to receive a fastener, when the tab engages the reflector dish slot.

19. The assembly of claim 18 wherein the reflector dish includes a plurality of slots and a plurality of apertures, the reflector bracket elements being positioned at corners of the reflector bracket, a pair of tabs being configured on lower corner elements and a pair of apertures being configured on upper corner elements of the reflector bracket to engage the slots and apertures of the reflector dish to mount the reflector dish to the reflector bracket.

20. The assembly of claim 18 further comprising an elbow bracket configured for coupling with an end of the support arm and configured for engaging with the reflector bracket for securing the support arm in relation to the reflector dish, the reflector bracket including a seat configured to receive a seat section of the elbow bracket to couple the elbow bracket and reflector bracket together, the seat having at least one boss extending on a side thereof and at least one support tab formed in the seat and spaced linearly from the at least one boss, the elbow bracket seat section including at least one guide slot formed therein that is configured for sliding over the at least one boss of the reflector bracket seat when the seat receives the seat section and including at least one support slot configured for receiving the at least one support tab of the reflector bracket seat when the seat receives the seat section for securing the at least one guide slot with the at least one boss and coupling the elbow bracket and the reflector bracket.

\* \* \* \* \*